(12) United States Patent
Park

(10) Patent No.: US 8,651,410 B2
(45) Date of Patent: Feb. 18, 2014

(54) ROTATION-RESTRICTING DEVICE FOR A FLY REEL SPOOL

(75) Inventor: Chang Ho Park, Gimhae-si (KR)

(73) Assignee: River Runs Co., Ltd., Gyeongsangnam-Do (KR)

( * ) Notice: Subject to any disclaimer, the term of this patent is extended or adjusted under 35 U.S.C. 154(b) by 1 day.

(21) Appl. No.: 13/391,628

(22) PCT Filed: Sep. 3, 2010

(86) PCT No.: PCT/KR2010/005988
§ 371 (c)(1),
(2), (4) Date: Feb. 22, 2012

(87) PCT Pub. No.: WO2011/028052
PCT Pub. Date: Mar. 10, 2011

(65) Prior Publication Data
US 2012/0145818 A1 Jun. 14, 2012

(30) Foreign Application Priority Data
Sep. 4, 2009 (KR) .................... 10-2009-0083301

(51) Int. Cl.
*A01K 89/01* (2006.01)
(52) U.S. Cl.
USPC ..................... 242/317; 242/295; 242/319
(58) Field of Classification Search
USPC ............... 242/244, 245, 295, 317, 319
See application file for complete search history.

(56) References Cited

U.S. PATENT DOCUMENTS

| | | | | |
|---|---|---|---|---|
| 2,609,160 | A | * | 9/1952 | Van Sciver et al. ........... 242/253 |
| 3,989,204 | A | * | 11/1976 | Lemery ......................... 242/295 |
| 4,515,325 | A | * | 5/1985 | Ito .................................. 242/295 |
| 4,657,201 | A | * | 4/1987 | Munroe ........................ 242/265 |
| 5,556,049 | A | * | 9/1996 | Bennett et al. ................ 242/295 |
| 6,382,544 | B1 | * | 5/2002 | Park ............................. 242/303 |
| 7,168,647 | B1 | * | 1/2007 | Kang ............................ 242/303 |

(Continued)

FOREIGN PATENT DOCUMENTS

| | | |
|---|---|---|
| CN | 2417706 Y | 2/2001 |
| KR | 100264093 | 5/2000 |

(Continued)

OTHER PUBLICATIONS

Korean Office Action Dated Nov. 2, 2009 in Related Korean Application No. 10-2009-0083301.

(Continued)

*Primary Examiner* — Emmanuel M Marcelo
(74) *Attorney, Agent, or Firm* — Volentine & Whitt, PLLC

(57) ABSTRACT

A dragging device restricting one-way rotation of a spool of a fly reel. In a rotation-restricting device of a spool having a dragging device which allows the spool to be attached to and detached from a shaft secured to a housing and which restricts one-way rotation of the spool, a sleeve is fitted on the shaft, a flange extends in the radial direction from one end of the sleeve, a flange cover is secured to the housing in the spool-attached direction, the flange makes contact between the flange cover and the housing, and a disk plate makes contact with the flange, whereby pressure applied due to rotation of a drag-adjusting knob mounted on the housing is transferred to the disk plate to restrict one-way rotation of the spool. A waterproof structure on the friction surface of the disk plate prevents infiltration of water.

3 Claims, 3 Drawing Sheets

(56) References Cited

U.S. PATENT DOCUMENTS

| | | | |
|---|---|---|---|
| 7,431,232 B1* | 10/2008 | Kang | 242/303 |
| 7,677,487 B2 | 3/2010 | Lee | |
| 7,815,139 B2* | 10/2010 | Lee | 242/303 |
| 2007/0176036 A1 | 8/2007 | Venes | |
| 2010/0025513 A1* | 2/2010 | Lee | 242/295 |

FOREIGN PATENT DOCUMENTS

| | | |
|---|---|---|
| KR | 100613149 | 8/2006 |
| KR | 100613149 B1 | 8/2006 |
| KR | 100660556 | 12/2006 |
| KR | 100660556 B1 | 12/2006 |
| KR | 100809444 | 12/2006 |
| KR | 100809444 B1 | 3/2008 |
| NL | 1002263 | 8/1997 |
| WO | WO2006129900 A1 | 12/2006 |
| WO | 2008072860 A1 | 6/2008 |

OTHER PUBLICATIONS

European Search Report dated Jan. 4, 2013.
Chinese Office Action with English translation dated Feb. 6, 2013.

* cited by examiner

ROTATION-RESTRICTING DEVICE FOR A FLY REEL SPOOL

TECHNICAL FIELD

The present invention relates to a dragging device which generates a control force of restricting the one-way rotation of a spool of a fly reel.

BACKGROUND ART

In general, a fly reel, which is a fishing tool allowing a fishing line to be wound around and unwound from a spool, includes the spool around which the fishing line is wound and a housing on which the spool is rotatably supported.

The fly reel is configured such that the spool is detachably mounted on the housing for easy replacement of the fishing line, that a control force of restricting rotation of the spool is applied to prevent the fishing line from being unwound from the spool, and that the fishing line is wound around the spool without resistance.

A conventional dragging device for generating a control force of restricting the one-way rotation of a spool of a fly reel has been described in Laid-Open Patent Publication No. 1999-0007561 (filed by the present applicant and published on Jan. 25, 1999). Referring to FIG. 1, the dragging device is configured such that a plunger 134 which moves forward due to the rotation of a drag-adjusting knob 140 pushes a second washer 125 toward a flange surface 122 which extends in the radial direction from the rear end of a cylindrical sleeve 120 rotatably mounted onto a main shaft 110, as a result of which the second washer 125 pushes a disk plate 124 to cause a friction contact between the disk plate and the flange 122 of the sleeve 120, which generates a control force of restricting the rotation of the sleeve 120.

A pushing force, which is exerted on the disk plate 124, is transferred to the sleeve 120 via the flange 122, but the sleeve 120 is not pushed due to a shoulder portion 113 disposed on the main shaft 110, so a control force of restricting the rotation of the spool is generated due to the friction between the disk plate 124 and the shoulder portion 113.

A one-way bearing 220 is mounted on the outer circumference of the sleeve 120 to restrict the one-way rotation. When the fishing line is unwound from the spool, the spool and the sleeve 120 are rotated together by the one-way bearing 220, while a control force is generated by the disk plate 124. Meanwhile, when the fishing line is wound around the spool, the linkage operation of the one-way bearing 220 and the sleeve 120 is interrupted, so the spool is freely rotated relative to the sleeve 120, allowing the fishing line to be wound around it.

However, the above configuration has the following problems because the control force of restricting the rotation of the spool is generated by the sleeve placed between the shoulder portion of the shaft and the disk plate. That is, there is a small friction contact area between the shoulder portion of the shaft and the disk plate, so the drag-adjusting knob should be rotated by a strong force to raise pressure in order to increase the control force of restricting the rotation of the spool. In addition, when the spool is detached, the friction surface which makes contact with the sleeve is exposed to the outside, and thus may be contaminated with foreign substances. Moreover, sliding takes place due to water infiltrated into the friction surface, which leads to the reduced control force. Furthermore, the shaft has a complicated section, which leads to a high processing cost.

DISCLOSURE OF THE INVENTION

An object of the present invention is to provide a configuration in which a friction contact area for generating a control force of restricting the one-way rotation of a spool is increased, such that a drag-adjusting knob only needs to be manipulated with a small force to generate a sufficient control force of restricting rotation.

Another object of the present invention is to provide a waterproof structure which prevents water from being infiltrated into a friction contact surface, while preventing the friction contact surface from being exposed to the outside, when a spool is detached from a shaft, to remove a risk of contamination.

A further object of the present invention is to provide a configuration in which a shaft has a simplified section, which leads to easy processing and low cost price.

According to an aspect of the present invention for achieving the above objects, a flange cover is secured to a housing, to which a shaft is secured, in the spool-attached direction, a flange extending in the radial direction from one end of a sleeve mounted on the shaft is disposed between the flange cover and the housing, and a disk plate is placed between the flange of the sleeve and the housing, whereby a pushing force, which is generated due to the rotation of a drag-adjusting knob connected to the shaft on the outside of the housing, is transferred to the disk plate by a plunger and a plate spring, so that the disk plate makes contact with the flange of the sleeve to generate a frictional force, and the flange is configured not to be pushed by the flange cover to restrict the rotation of the sleeve, as a result of which the spool is rotation-restricted or freely rotated by a one-way bearing mounted on the sleeve.

In addition, a waterproof structure, which can prevent water from being infiltrated into the friction contact surface of the disk plate, can be provided by placing an O-ring or gasket on a contact surface of the sleeve fitted on the shaft, a contact surface between the sleeve and the flange cover, and a contact surface between the drag-adjusting knob and the housing.

Moreover, a friction material, which can enhance a frictional force, is interposed on a contact surface between the disk plate and the flange and a contact surface between the flange and the flange cover for more increasing the frictional force.

The present invention has the following effects. Since the friction area for restricting the rotation of the spool is increased, the drag-adjusting knob only needs to be manipulated with a small force to easily restrict the rotation of the spool. Although the spool is detached from the shaft, the friction surface for restricting the rotation of the spool is not exposed to the outside and thus not contaminated with foreign substances. Furthermore, there is no risk of reducing the control force of the drag due to infiltration of water. Finally, the shaft has a simple shape to enable easy manufacturing and assembly, which leads to a low production cost.

BEST MODE FOR CARRYING OUT THE INVENTION

Figure 1:
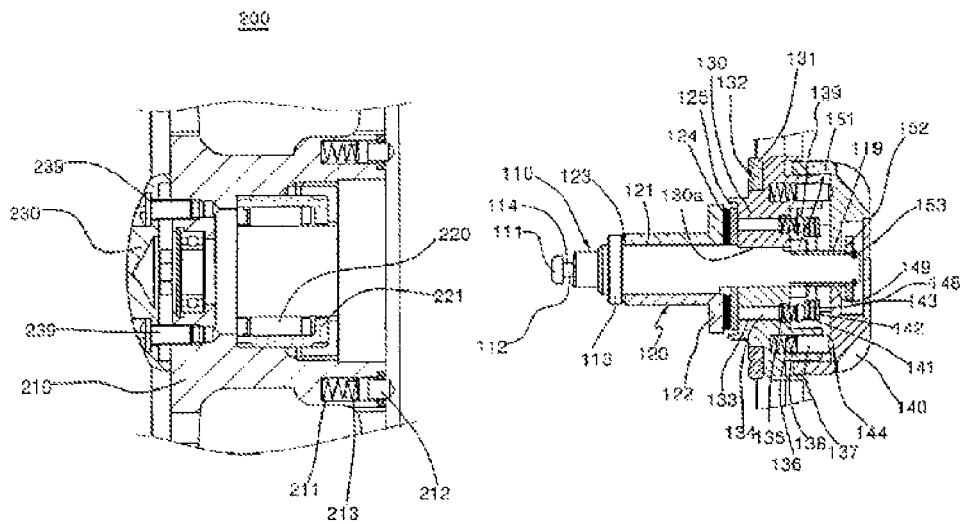
FIG. 1 is a partial enlarged sectional view showing Laid-Open Patent Publication No. 1999-0007561.

The best mode provides a rotation-restricting device of a spool of a fly reel having a dragging device which can allow the spool to be attached to and detached from a shaft secured to a housing and which can restrict the one-way rotation of the spool, wherein a sleeve 13 is fitted on a shaft 12 secured to a housing 11, a flange 22 extends in the radial direction from one end of the sleeve 13, a flange cover 24 is secured to the housing 11 in the spool 10-attached direction, the flange 22 makes contact between the flange cover 24 and the housing 11, and a disk plate 21 makes contact with the flange 22, whereby the pressure applied due to the rotation of a drag-adjusting knob 16 mounted on the outside of the housing 11 is transferred to the disk plate 21 to be able to restrict the one-way rotation of the spool.

Hereinafter, a preferred embodiment of the present invention will now be described in detail with reference to the accompanying drawings.

Figure 2:
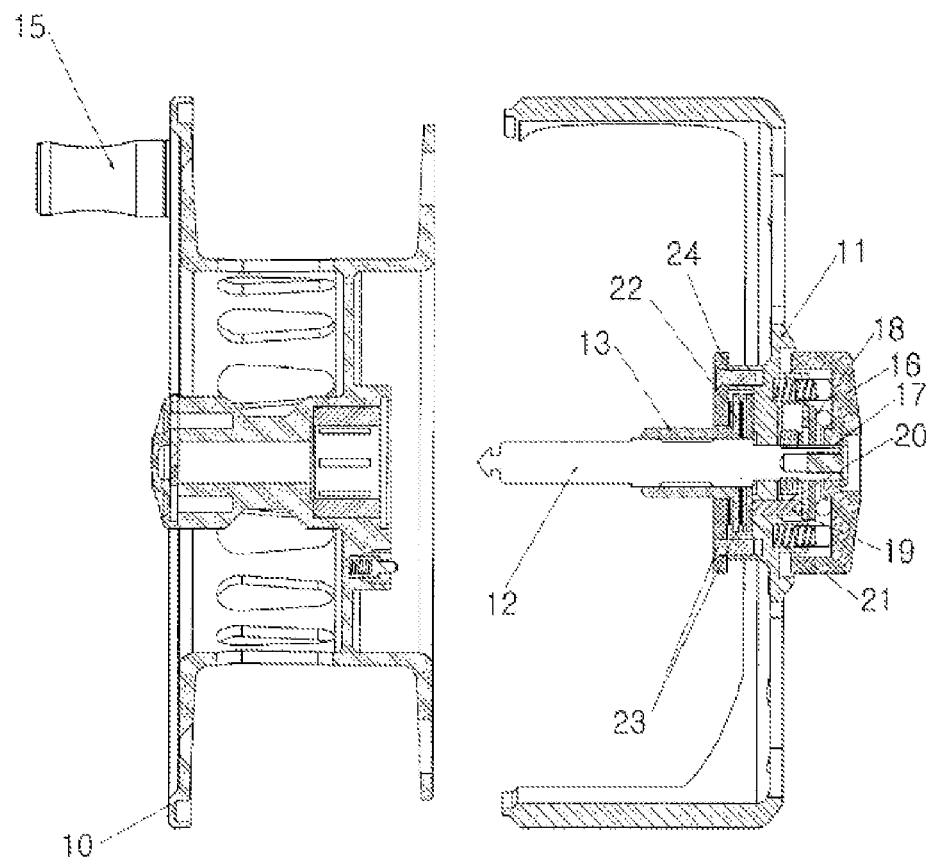
FIG. 2 is a sectional view showing a spool and a housing of a fly reel according to the present invention in a detached state.
Figure 3:
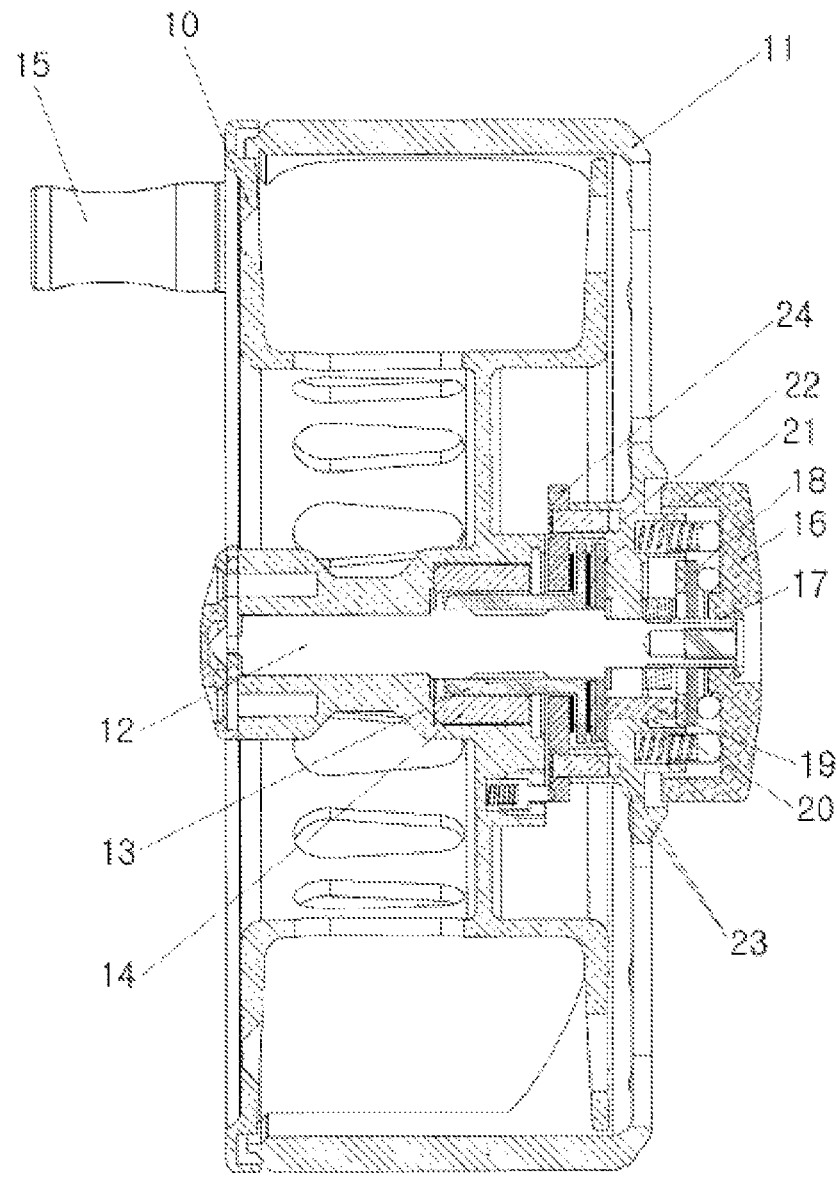
FIG. 3 is a sectional view showing the spool and the housing of the fly reel according to the present invention in an attached state.
Figure 4:
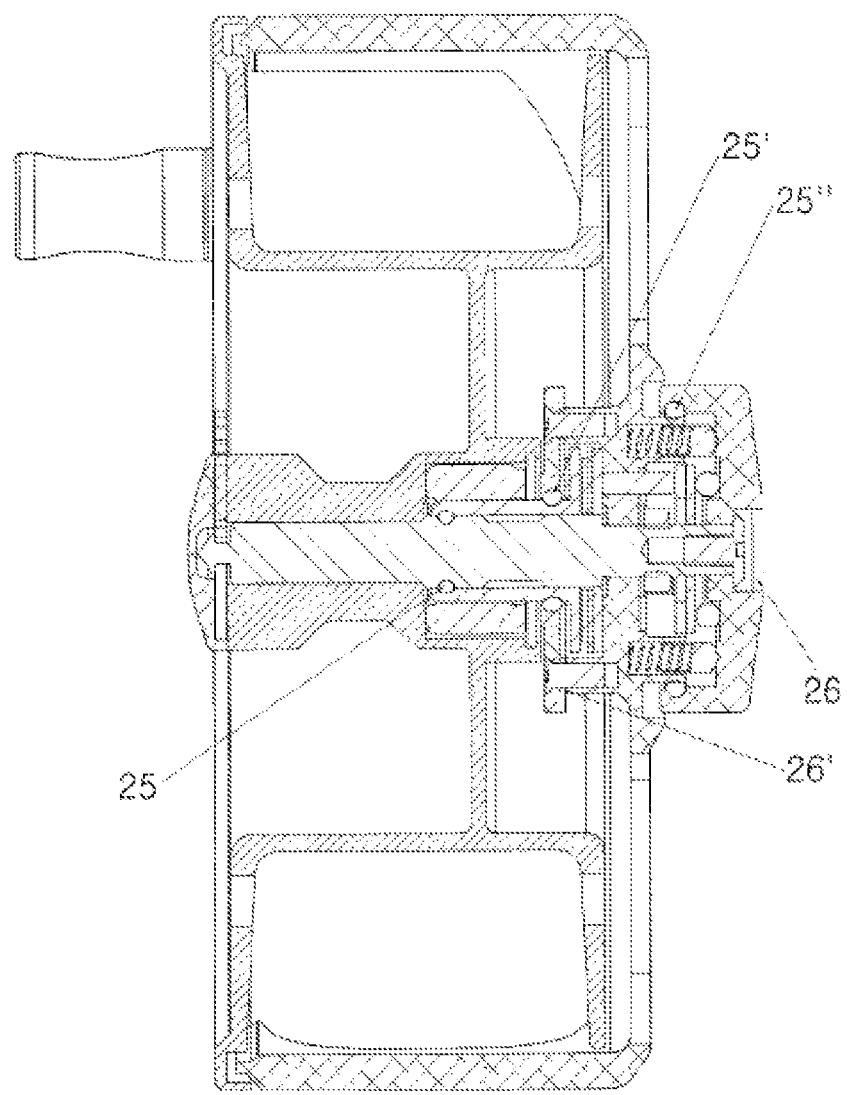
FIG. 4 is a sectional view showing another embodiment of the present invention.

FIG. 2 is a sectional view showing a spool and a housing of a fly reel according to the present invention in a detached state, FIG. 3 is a sectional view showing the spool and the housing of the fly reel according to the present invention in an attached state, and FIG. 4 is a sectional view showing another embodiment of the present invention.

In the detailed description of the invention, well-known structures will not be described in detail or will be described in brief not to unnecessarily obscure characteristic structures of the present invention.

As shown in the drawings, a fly reel of the present invention includes a spool 10 and a housing 11 which rotatably supports the spool 10 and encircles it from one side.

A one-way bearing 14 is interposed between the spool 10 and a shaft 12 secured to the center of the housing 11 and the sleeve 13 fitted on the shaft 12 and configured to be rotation-restricted. A handle 15 is provided on the edge of the spool 10.

The shaft 12 is secured, passing through the center of the housing 11, and a drag-adjusting knob 16 is secured to the shaft 12 on the outside of the housing 11, i.e., on the opposite side to the spool 10-mounted side. The drag-adjusting knob 16 is coupled to a screw portion 17, which is disposed at the end of the shaft 12, and rotated to push a plate spring 18 in the spool 10-mounted direction, as a result of which a plunger 19 making contact with the plate spring 18 is pushed via a through hole 20 of the housing 11 to apply the pressure to push a disk plate 21 placed on the spool 10-mounted side of the housing 12.

The disk plate 21 makes contact with the flange 22 extending in the radial direction from one end of the sleeve fitted on the outer circumference of the shaft 12. Here, a friction material 23 for enhancing a frictional force may be interposed on or attached to a contact surface between the flange 22 and the disk plate 21.

The other side of the flange 22, which makes contact with the disk plate 21, makes contact with the flange cover 24 secured to the housing 11. Here, a friction material 23 may be interposed on or attached to a contact surface between the flange 22 and the flange cover 24.

The flange cover 24, which makes contact with the flange 22, serves to retain the flange 22 not to be pushed in the axial direction by a pushing force applied by the disk plate 21.

The one-way bearing 14 is mounted on the outer circumference of the sleeve 13 incorporated with the flange 22, and the spool 10 is mounted on the outer circumference of the one-way bearing 14.

FIG. 4 is a sectional view showing a waterproof structure for preventing water from being infiltrated into a friction contact surface of the disk plate 21 according to another embodiment of the present invention.

The fly reel always has a risk of water filtration since it is affected by weather conditions such as a rainy day or by places such as the waterside.

When water is infiltrated into the working part of the fly reel, it causes liquid lubrication on the friction contact surface for restricting the rotation of the spool through the drag-adjusting knob, and thus causes sliding which reduces the control force of restricting rotation.

In the present invention, an O-ring 25 or a plate packing 26 is placed on all the paths, through which water may be infiltrated into the friction contact surface, for preventing infiltration of water and resultant sliding.

O-rings 25, 25' and 25" are placed on a contact surface between the shaft 12 and the inner circumference of the sleeve 13, a contact surface between the flange cover 24 and the outer circumference of the sleeve 13, and a contact surface between the drag-adjusting knob 16 and the housing 11, respectively, to prevent infiltration of water.

In addition, plate packings 26 and 26' are placed on a connection portion between the center of the drag-adjusting knob 16 and the shaft 12 and a connection portion between the flange cover 24 and the housing 11, respectively, to maintain air tightness.

The O-rings 25, 25' and 25" and the packings 26 and 26' protect the friction contact surfaces of the drag without infiltration of water, which makes it possible to prevent the fishing line from being excessively unwound from the spool due to the reduced frictional force.

The operation of the present invention will now be described.

When the fishing line is unwound from the spool 10, the sleeve 13 mounted on the shaft 12 is rotated together with the spool 10 by the one-way bearing 14 connected to the spool 10, and when the fishing line is wound around the spool 10, only the spool 10 is rotated by the one-way bearing 14 connected thereto without the sleeve 13 being rotated.

When the fishing line wound around the spool is unwound as a fish takes a bait, it is possible to reduce the rotational speed of the spool 10 by applying a frictional force to the flange 22 of the sleeve 13, which is rotated together with the spool 10. In detail, as the drag-adjusting knob 16 mounted on the housing is rotated, the plate spring 18 and the plunger 19 move forward, applying the pressure to the disk plate 21. Then, the disk plate 21 pushes the flange 22, and the flange 22 is rotation-restricted between the flange cover 24 and the disk plate 21 by the frictional force, which generates the control force.

The drag-adjusting knob 16 can be used to control the unwinding speed of the fishing line. The fishing line can be wound around the spool 10 by manipulation of the handle, regardless of its unwinding speed. When the fishing line is wound, the linkage operation with the flange 22 of the sleeve 13 is interrupted by the one-way bearing 14, so there is no load.

The present invention can be used in the fly reel manufacturing industry.

What is claimed is:

1. A rotation-restricting device of a spool of a fly reel having a dragging device which can allow the spool to be attached to and detached from a shaft secured to a housing and which can restrict one-way rotation of the spool, wherein a sleeve is mounted on the shaft secured to the housing, a flange extends in the radial direction from one end of the sleeve, a flange cover which serves to retain the flange so as not to be pushed in the axial direction is secured to the housing in a spool-attached direction, the flange makes contact between the flange cover and the housing, and a disk plate makes contact with the flange, whereby the pressure applied due to the rotation of a drag-adjusting knob mounted on an outside of the housing is transferred to the disk plate to be able to increase the friction forces between the flange and the disk plate, and between the flange and the flange cover, so as to restrict the one-way rotation of the spool.

2. The rotation-restricting device as claimed in claim 1, wherein a friction material is interposed between the flange cover and the flange and the disk plate.

3. The rotation-restricting device as claimed in claim 1, wherein an O-ring is placed on a contact surface between the outer circumference of the shaft and the inner circumference of the sleeve, a contact surface between the outer circumference of the sleeve and the flange cover, and a contact surface between the drag-adjusting knob and the housing, respectively, and a plate packing is placed on a connection portion between the drag-adjusting knob and the shaft and a connection portion between the flange cover and the housing, respectively, to prevent water from being infiltrated into a friction contact surface of the disk plate.

\* \* \* \* \*